United States Patent [19]

Jones et al.

[11] Patent Number: 4,622,753
[45] Date of Patent: Nov. 18, 1986

[54] ELECTRIC METER SOCKET REPAIR KIT AND TEMPLATE FOR USE THEREWITH

[75] Inventors: David W. Jones, Novi; Albert K. Langdon, Rochester; Allen V. Pruehs, Pontiac; Darrell A. Robinson, Milford, all of Mich.

[73] Assignee: Ekstrom Industries, Farmington Hills, Mich.

[21] Appl. No.: 755,846

[22] Filed: Jul. 17, 1985

[51] Int. Cl.⁴ .................................... B23Q 49/02
[52] U.S. Cl. ................................. 33/189; 33/562; 33/DIG. 10
[58] Field of Search ............... 33/189, 562, DIG. 10, 33/191

[56] References Cited

U.S. PATENT DOCUMENTS

| | | | |
|---|---|---|---|
| 3,078,585 | 2/1963 | Dearborn | 33/189 |
| 3,204,493 | 9/1965 | Severdia | 33/189 |
| 4,259,785 | 4/1981 | Wortham | 33/189 |

FOREIGN PATENT DOCUMENTS 2812273  9/1979  Fed. Rep. of Germany .... 33/DIG. 10

Primary Examiner—Willis Little
Attorney, Agent, or Firm—Robert E. Ross

[57] ABSTRACT

A repair kit for an electric meter socket, which includes a set of jaw contacts mounted on a support plate, with means for mounting said plate in a desired spaced relation to the back of the meter box so that the blade contacts of the meter will be inserted into the jaw contacts for a suitable depth when assembled, and a template for temporarily mounting into the meter aperture in the meter box cover, said template having a series of guide holes for receiving a punch for marking the position for plate mounting holes in the back of the meter box, and means for orienting said template so that said holes will be in a position such as to allow the meter to be in a desired orientation after assembly.

9 Claims, 9 Drawing Figures

ELECTRIC METER SOCKET REPAIR KIT AND TEMPLATE FOR USE THEREWITH

BACKGROUND OF THE INVENTION

In metering electric power as used, for example, in a residence, a meter box is provided with a set (usually four) of jaw contacts mounted onto the back wall of the box. The electric meter is provided with blade contacts on the rear, which plug into the jaw contacts when the meter is assembled. The meter is mounted in and retained in place by the box cover, which may be of the ringless type, in which the meter aperture in the cover is sized so that the periphery of the cover around the aperture bears against the meter flange, or of the ring type, in which the portion of the box cover around the aperture is formed into an outwardly curled lip, and a clamping ring is used to clamp the meter flange to the lip.

In either type of box, the jaw contacts often become corroded, lose their spring action so that a good contact is not made with the meter contact blades, or are damaged by vandals or by persons attempting to obtain power without it being recorded by the meter. In such a case it has heretofore often been necessary remove and replace the entire meter box. In many installations this is a difficult and time consuming job, since it requires that the power lines be removed from the old box and inserted into the new box. This can be particularly difficult in situations where a number of meter boxes are mounted closely together, such as in an apartment building.

SUMMARY OF THE INVENTION

This invention provides a replacement kit for an electric meter socket, comprising a jaw contact assembly with means for mounting onto the back of a meter box after the defective contacts have been removed, and a template for temporarily mounting into the meter opening in the box cover to locate the mounting position of the jaw contact assembly. In the illustrated embodiment the template has means enabling the back of the meter box to be marked for drilling mounting holes for the jaw contact assembly, and means for orienting the mounting holes so that the assembled jaw contact assembly is disposed in the proper orientation to receive the contact blades of the assembled meter.

The jaw contact assembly is provided with means to enable it to be mounted in a desired spaced relation to the back of the meter box, so that when the meter is assembled, the blade contacts of the meter will protrude into the jaw contacts an adequate distance for satisfactory electricial contact.

The structure of the template enables it to be used with either a ring type or ringless type meter box.

DESCRIPTION OF THE ILLUSTRATED EMBODIMENT

Figure 1:
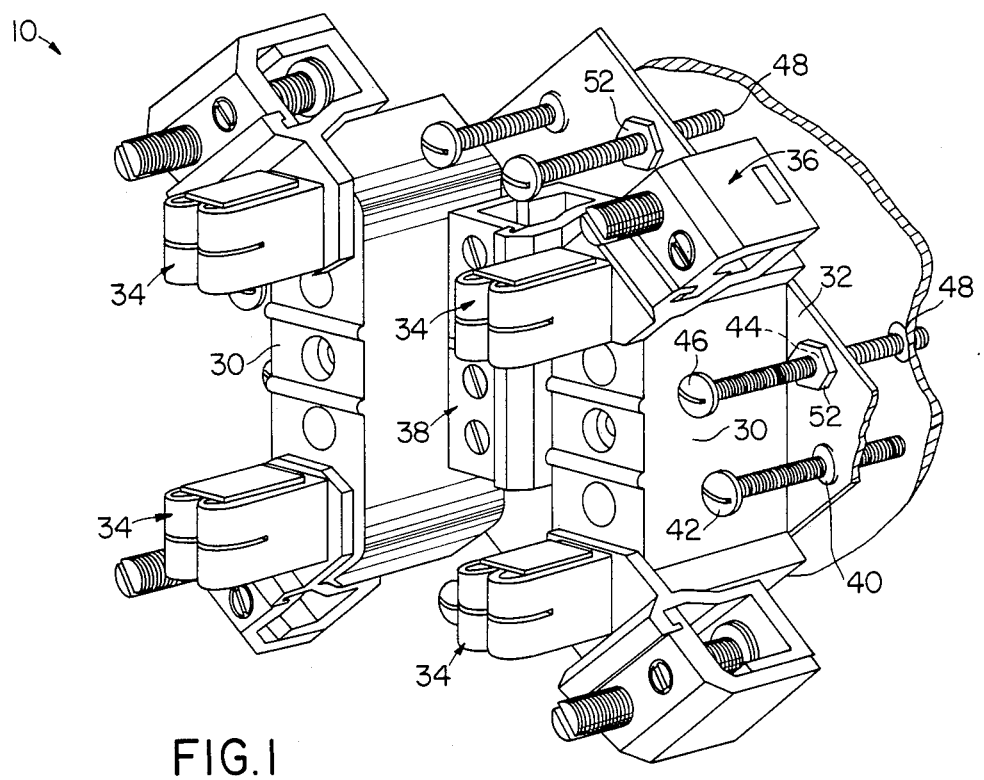
FIG. 1 is a perspective view of a jaw block assembly with spacer and mounting bolts, installed into a meter box, as seen from the front.
Figure 2:
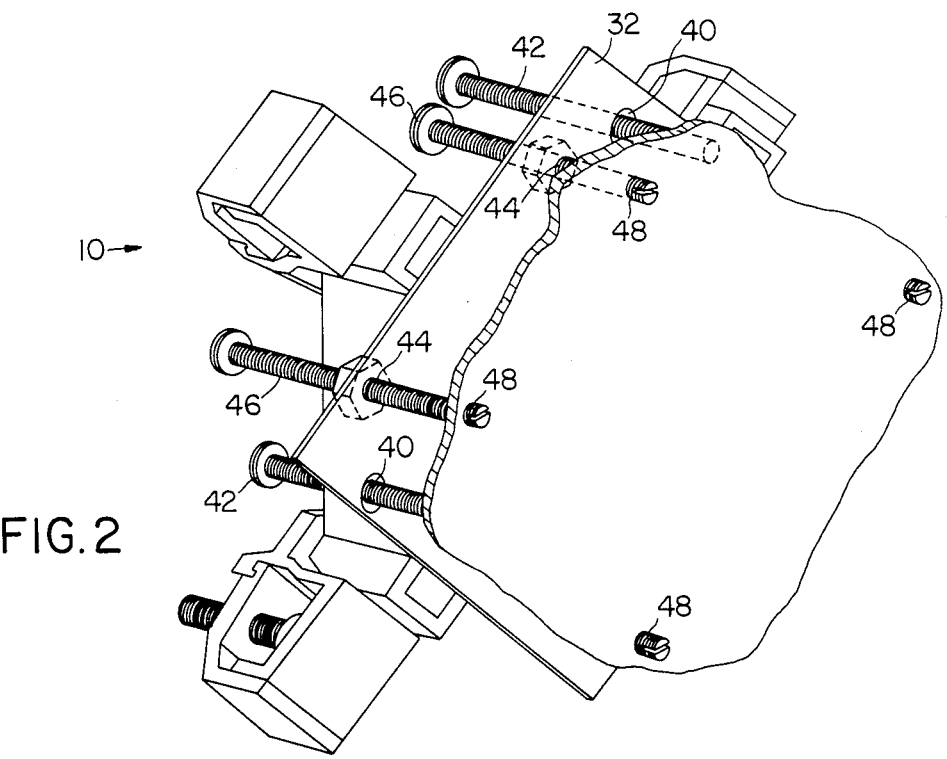
FIG. 2 is a view of the assembly of FIG. 1 as seen from the rear.

Referring to the drawings, there is illustrated a repair kit for an electric meter socket, which comprises a jaw block assembly 10 and a template 12 for locating and orienting mounting holes for the jaw block assembly in a manner to appear hereinafter.

The repair kit is intended to be used to replace the jaw connectors of the type that are used in a meter box 14 that receives a meter 16 of the type that has a housing 18, a peripheral mounting flange 20, and rearwardly extending contact blades 22.

In one type of meter box into which such a meter is mounted (See FIGS. 5 and 6) the box cover 23 has an aperture 24 which is positioned and sized to allow the front portion of the meter housing to project therethrough, with the forward side of the meter flange 20 bearing against the edge 26 of the aperture, thereby retaining the meter in assembly in the housing.

In another type of meter box 14a (see FIGS. 3 and 4) the portion of the box cover 23A is turned radially outwardly forming a mounting flange 28. The meter is retained in assembly in boxes of this type by a clamping ring which has a U-shaped cross section which clamps the meter flange 20 to the box cover flange 28A.

Boxes of both types are well known in the art, and have been standardized in size, as has the electric meter 16, so that a standard electric meter will fit into either type of meter box. The repair kit of this invention can also be used with either type of meter box, as will be described hereinafter.

The jaw block assembly 10 comprises, in the illustrated embodiment, a pair of insulator blocks 30 mounted onto a support plate 32, a pair of jaw contacts 34 mounted on each insulator block, and a wire terminal 36 mounted with each jaw contact. A grounding terminal 38 may be mounted onto the support plate.

The meter boxes for which the repair kit is to be used have various depths, depending on the manufacturer and the type, and therefore means must be provided for mounting the jaw block assembly 10 at various distances from the back of the meter box. For this purpose, a number of threaded apertures 40 are provided in the support plate 32, to receive threaded spacers 42, which are adjustable in the apertures so that they protrude a desired distance rearwardly from the support plate, To retain the support plate in a rearmost position so that the ends of the spacers bear against the back of the meter box, a set of unthreaded holes 44 are provided in the support plate, to receive retaining screws 46, which are self-tapping screws which can be screwed into suitably positioned apertures 48 in the back of the meter box, (to be positioned in a manner to be described hereinafter, and have clamping nuts 52 mounted thereon between the screw head and the support panel. The nuts 52 may be tightened down on the screws 46, forcing the support plate 32 toward the back of the panel, until the spacers 42 bear against the back of the panel, thereby retaining the jaw block assembly securely held in the box in the proper position to receive the blade contacts 18 of the meter 16.

Since the position of the meter (in lateral directions) is determined by the position of the meter aperture in the cover of the box, the mounting apertures 48 in the back of the box must be so positioned that when the jaw block assembly is mounted in the box by means of the retaining screws engaging the mounting apertures, the jaws 34 will be positioned and oriented to receive the meter contact blades and retain the meter in a position such that it will be centered in the opening in the box cover and oriented into an upright position.

In the illustrated embodiment of the invention, the positioning of the jaw block assembly mounting holes 48 is accomplished by the use of the template 12 in a manner now to be described.

The template 12 comprises a disc having peripheral means which simulates the size and shape of the periphery of a standard electric meter as used in the industry, and has an outer edge 54 which has a diameter greater than that of the meter aperture 24, and simulates the meter flange 24, and a forwardly extending flange 56 which has an outer diameter that simulates the diameter of the meter housing portion forward of the meter flange. A rearwardly extending portion is provided on the rear face of the disc, which has an outer periphery 58 which has a diameter simulating the portion of a meter housing to the rear of the meter flange, all for purposes to appear hereinafter.

To retain the template in an aperture of a cover of a meter box wherein the meter mounting is by means of a clamping ring, a hanger 59 is provided on the top of the rear side of the template, the hanger being so positioned that when the template is hung by the hanger on the flange 28A of a meter box cover of the ring mounting type, the template hangs in front of and is held centered in the opening by the rearwardly extending portion 58.

The template is provided with 4 bushings 60 having elongated guide apertures 62 extending therethrough to receive an elongated rod 64. The rod 64, which has a diameter substantially the same as that of the apertures 62, with only enough clearance to allow it to slide freely through the apertures, serves as a prick punch, having a pointed end and a headed end.

To orient the template in the aperture, a bubble level 66 is provided on the face thereof, said level being so oriented that when the bubble is centered, the guide apertures are so oriented that when the jaw block is assembled using the mounting holes marked by use of the guide apertures, the meter will be in the proper orientatation when assembled into the jaw block contacts.

The close fit between the bushing aperture and the rod insures that when the rod is inserted through the bushing after the template is mounted in the meter aperture, the sharp end of the rod will contact the rear of the box in the desired position for a jaw block mounting hole to be drilled. The position of a jaw block mounting hole may then be marked on the back of the meter box by striking the head of the rod with a hammer.

After the rod has been used sequentially in all four guide apertures 62 to mark four position on the back of the box, the template may be removed and the mounting holes 48 drilled.

To prepare the jaw block assembly for mounting onto the back of the box, the distance the support plate must be positioned from the back of the box first determined by measuring the overall height of the old jaw block assembly that has been removed from the meter box. Since the insulating block of such haw blocks (not shown) is, in most cases, mounting against the back of the box, this merely requires measuring the distance from the bottom of the insulating block to the top of the jaw contacts. The threaded spacers 42 may then be screwed into the threaded apertures 40 until they protrude from the rear of the support panel a distance such that the distance from the end of the spacers to the top of the jaw contacts of the new jaw block assembly is the same as the measurement just obtained from the old jaw block assembly.

The clamping nuts 52 may then be assembled onto the retaining screws until they are near the head end thereof, and the retaining screws inserted through the unthreaded holes 44, and screwed into the mounting holes 50. The mounting screws 48 are preferably self-tapping screws so that the mounting holes 50 need not be independently threaded.

After the mounting screws have been securely fastened into the mounting holes, the jaw block assembly may be held against the back of the box, and the clamping nuts 52 are then rotated down against the support panel, thereby forcing the spacers 42 securely against the back of the box.

Electricial connections may then be made to the jaw block assembly and the meter assembled with the jaw block assembly in the usual manner.

Figure 5:
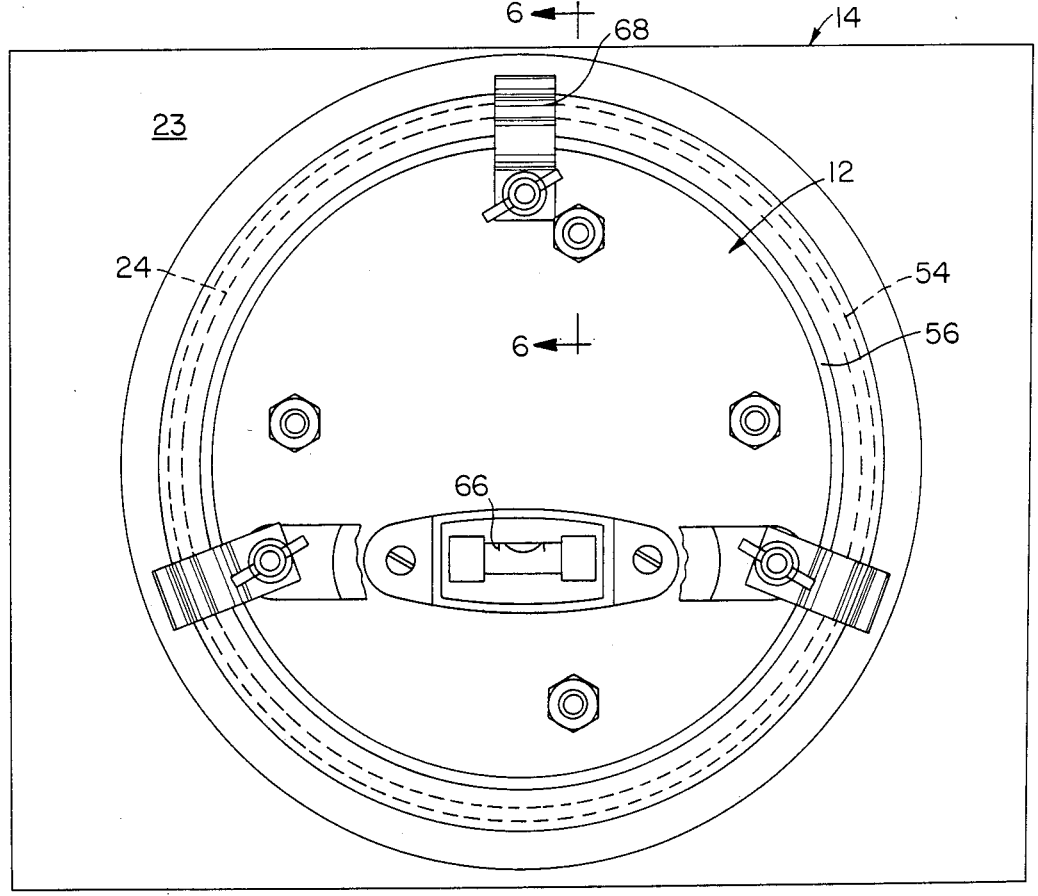
FIG. 5 is a front plan view of the template mounted into the aperture of a meter box cover of the ringless type.
Figure 6:
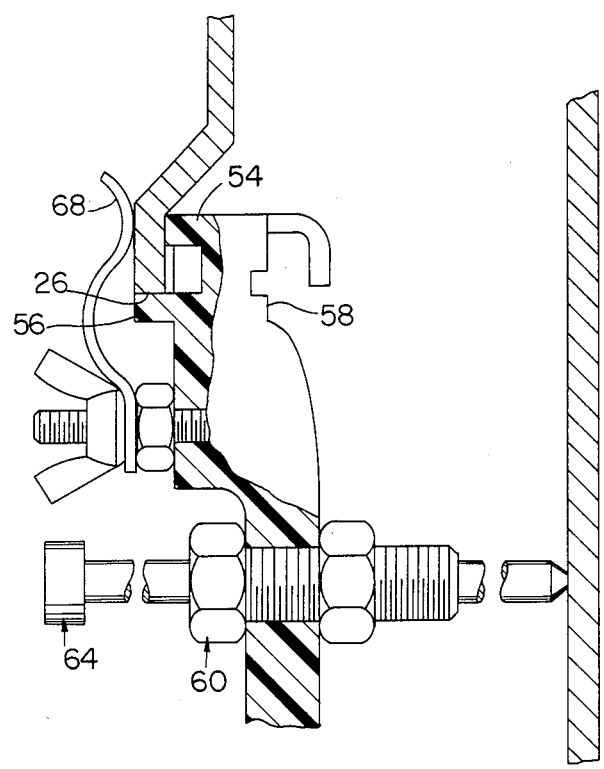
FIG. 6 is a view in section taken on line 6—6 of FIG. 5.
Figure 7:
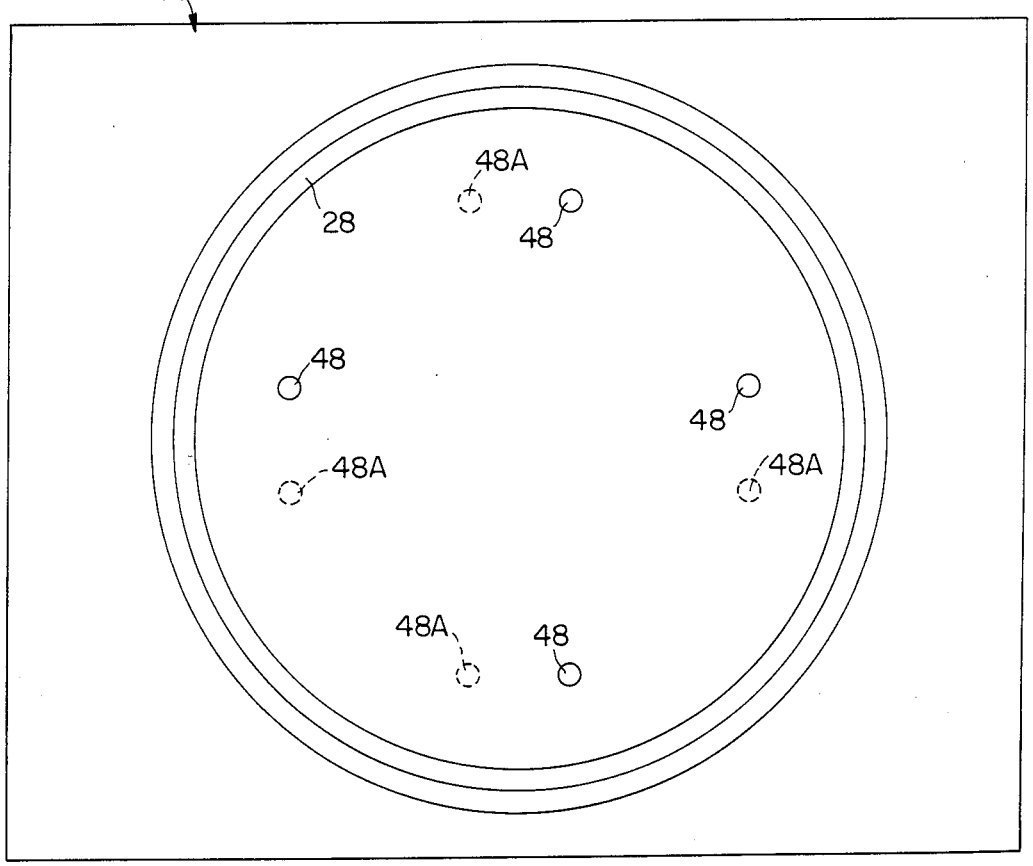
FIG. 7 is a front plan view of the back of a meter box showing the mounting holes which have been drilled after being located by the template.
Figure 8:
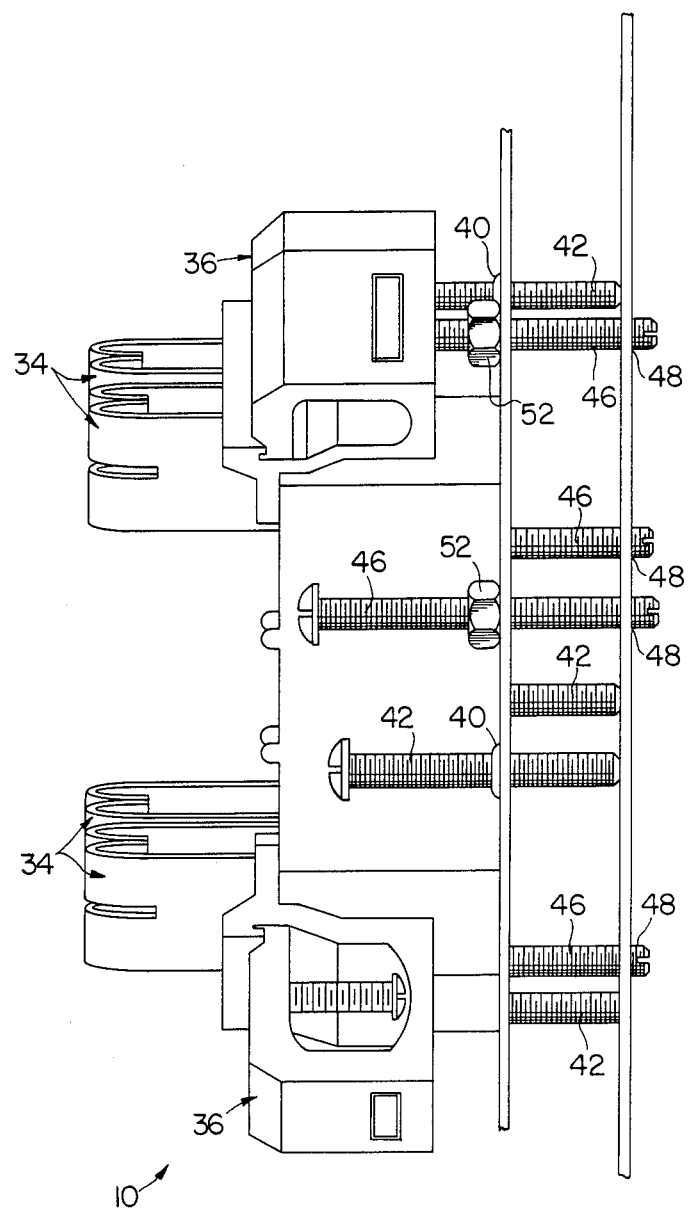
FIG. 8 is a view in side elevation of the jaw block assembly mounted onto the back of a meter box, showing the means for adjustably spacing the assembly from the back of the box.
Figure 9:
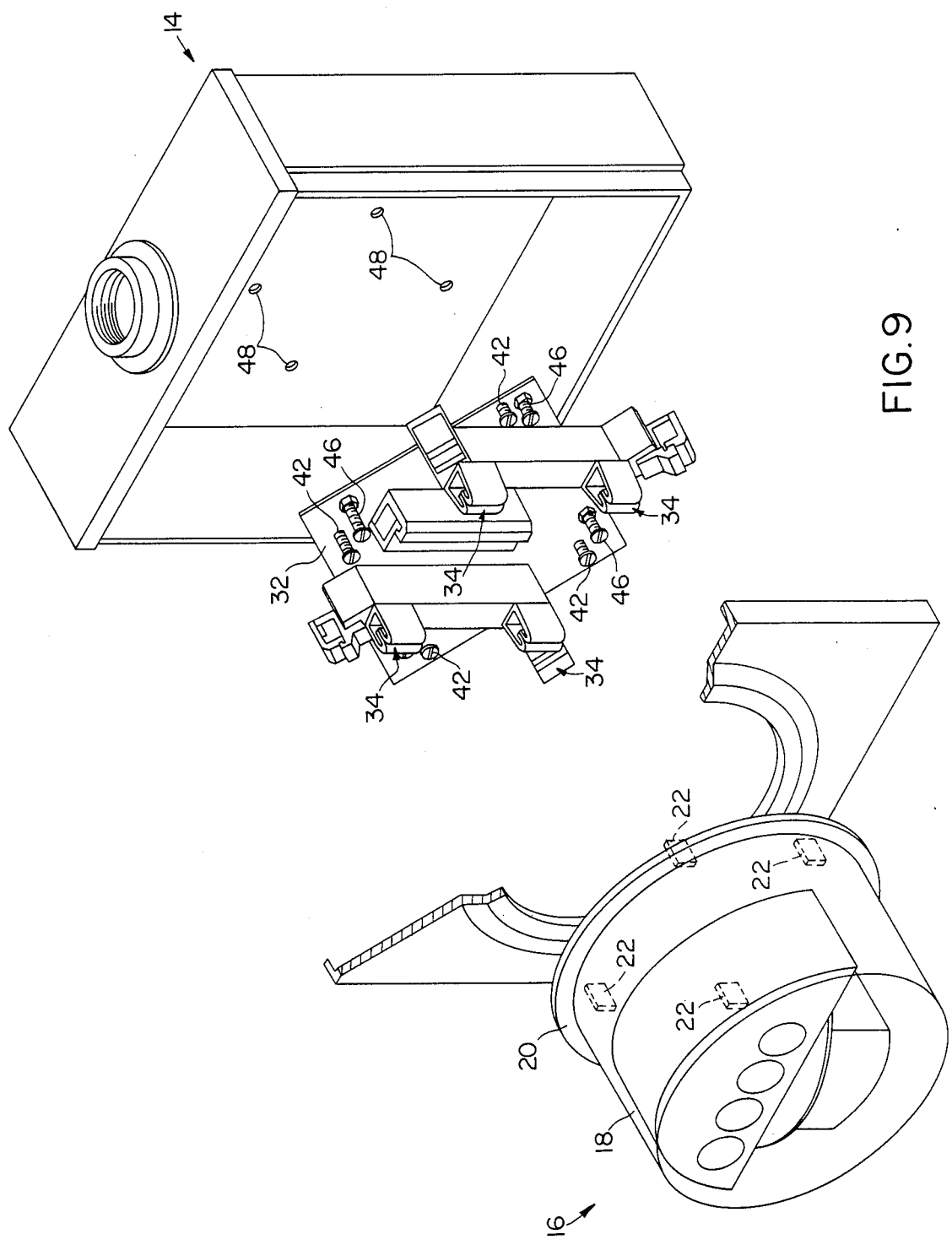
FIG. 9 is an exploded view of the meter, jaw block assembly, and meter box.

The template 12 may be used to install a jaw block assembly 10 in a meter box of the ringless type in the manner shown in FIGS. 5 and 6, by mounting the template into the meter opening from the rear of the cover, and retaining it in place by clips 66, after orienting to a position at which the bubble of the level 59 is centered. Mounting holes 48 may then be made in the manner previously described.

Figure 3:
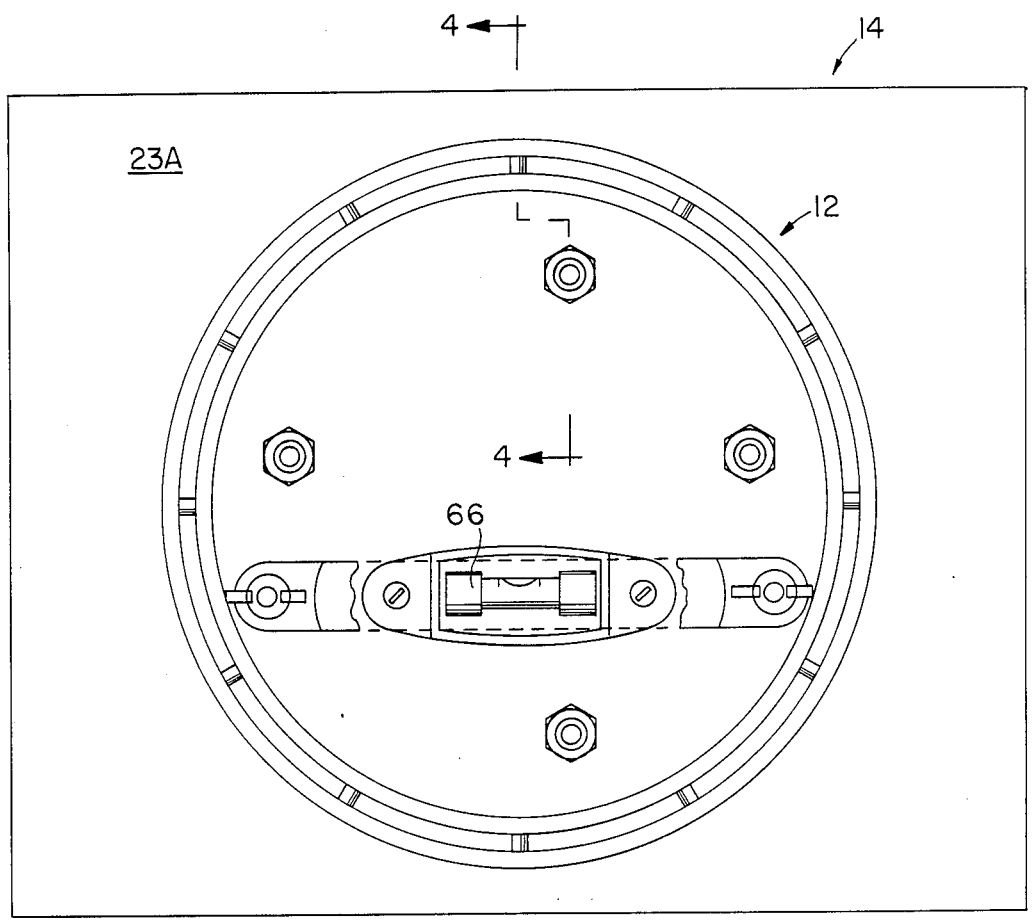
FIG. 3 is a front plan view of a template mounted into the meter apertute of a meter box cover of the ring type.
Figure 4:
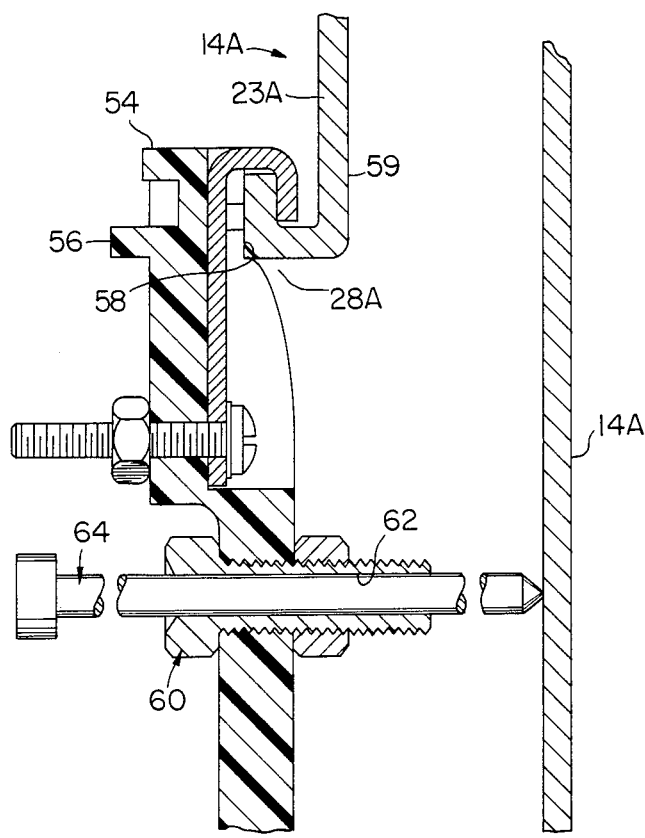
FIG. 4 is a view in section taken on line 4—4 of FIG. 3.

In the illustrated embodiment of the invention, the unthreaded holes 44 in the plate 32 for the mounting screws 46 and the guide apertures 62 in the template 12 are so positioned that if the template is rotated 180° from the position shown in FIG. 3, the mounting holes (48a) made with the template in such position will be offset from the position of the mounting holes 48 made when the template is in the upright position.

Thus if the condition of the back of the meter box is unsuitable for one or more of the mounting holes made with the template in the normal orientation, the mounting holes may be shifted to the offset position, if necessary to enable the mounting holes to be positioned in a more suitable location, by inverting the template.

This is accomplished in the illustrated embodiment (FIG. 3) by offsetting the upper and lower guide apertures 62 to the right of the vertical centerline of the template, and offsetting the right and left guide apertures above the horizontal centerline. Therefore when the template, which positions the mounting holes at 48 when in the normal upright position, will position the mounting holes at positions 48a when in the inverted position.

Although in the illustrated embodiment of the invention, threaded spacers are used to space the support plate from the back of the box, it will be understood that other means may be used if desired.

Since certain other changes apparent to one skilled in the art may be made in the herein described embodiments of the invention without departing from the scope thereof, it is intended that all matter contained herein be interpreted in an illustrative and not a limiting sense.

We claim:

1. A repair kit for a socket for an electric meter of the type having rearwardly extending blade contacts and which is mounted into an aperture of a front cover of a meter box, said kit comprising a jaw contact assembly including a support plate, a set of jaw type contacts mounted onto the support plate in suitable spaced relation to receive the blade contacts of a meter, means on the support plate for mounting said assembly in adjustable spaced relation to a rear wall of the meter box, and means mountable into the meter aperture for enabling the positioning and orientation of mounting means on the rear wall of the meter box so that when the support plate is assembled with said mounting means, the jaw contacts thereon will be aligned with the blade contacts of an assembled meter when the meter is properly oriented in the meter opening.

2. A repair kit as set out in claim 1 in which said support plate has rearwardly extending means for engaging into mounting apertures in the rear wall of the meter box, and said means mountable into the meter aperture has guide means for locating the position in the rear wall of the meter box at which said apertures should be formed to position and orient the jaw assembly.

3. A repair kit for a socket for an electric meter of the type having a flange around the housing and rearwardly extending blade contacts and which is mounted into an aperture of a meter box, said kit comprising a jaw block assembly comprising insulating means and jaw type connectors mounted thereon and extending forwardly therefrom, means for connecting the jaw block assembly to mounting apertures in the rear inner surface of a meter box in such spaced relation thereto as to suitably position the jaw contacts a desired distance from said rear inner surface to enable the jaws to receive the meter blades when the meter is mounted into the box, and a template for positioning the jaw block mounting apertures on the rear surface of the meter box, said template having a peripheral portion which simulates the configuration of the meter flange and adjacent portion of the meter housing and means for removably retaining said template in the meter opening, said template having means enabling orientation to a predetermined rotational position, and having a plurality of guide apertures extending therethrough, said guide apertures being in a position such that apertures formed in the rear wall of the meter box in alignment with the guide apertures will permit mounting of the jaw block assembly in the desired position and orientation.

4. A meter repair kit as set out in claim 3 in which the insulating means is mounted on the front face of a support plate, said plate having rearwardly projecting spacing members for bearing against the rear of the box to position the jaw contacts a desired distance from the rear of the box, means allowing adjustment of the distance said spacing members extend rearwardly, and clamping members, each comprising a threaded member projecting freely through a support plate aperture rearwardly from the support plate, each threaded member having means on the rear end for engagement with the rear of the meter box, and adjustable clamping means on the portion thereof disposed forwardly of the support plate which can be tightened against the support plate to force the spacing members tightly against the rear of the meter box, whereby the jaw contacts can resist axial forces imparted by the insertion and removal of the meter contact blades.

5. A template for mounting into a meter aperture in the front cover of a meter box of the type that receives a meter having a housing with a peripheral mounting flange and rearwardly extending blade contacts to enable the location of mounting apertures in the rear wall of the meter box for mounting a jaw contact assembly into the meter box, said template comprising a disc having a peripheral portion which simulates the size and configuration of the meter flange and an adjacent housing portion, means on the template for enabling the location of mounting apertures at the rear wall of the meter box, said means comprising bushings mounted in the disc and having elongated guide holes which extend perpendicularly to the plane of the disc for receiving a marking rod so as to allow free axial movement of said rod yet maintains the axis of said rod substantially perpendicular to the plane of the disc.

6. A template as set out in claim 5 in which has a periphery which has a diameter greater than the diameter of the meter opening, and forwardly and rearwardly projecting portions which have a diameter less than that of the periphery and substantially the same diameter as the diameter of a meter forwardly and rearwardly respectively of the meter mounting flange.

7. A template as set out in claim 5 which comprises a bubble level mounted thereon in an orientation such that when the bubble is centered, the guide holes are oriented to the proper position that mounting holes formed in the rear wall of the box in alignment with the guide holes will be in the proper position for mounting the jaw contact assembly.

8. A template as set out in claim 5 in which said guide holes are so positioned that if the template is inverted, the guide holes will not coincide with the position of the guide holes when the template is upright.

9. A template as set out in claim 5 in which a vertically spaced pair of guide holes are positioned in offset relation to the vertical centerline of the template, and a pair of horizontally spaced guide holes are positioned in offset relation to the horizontal centerline of the template.

* * * * *